United States Patent [19]

Fukushima et al.

[11] Patent Number: 5,241,371
[45] Date of Patent: Aug. 31, 1993

[54] IMAGE DISPLAY CONTROL APPARATUS AND STILL PICTURE REPRODUCING SYSTEM

[75] Inventors: Akio Fukushima; Toshihiko Maruyama; Tomohiro Kimura, all of Tokyo, Japan

[73] Assignee: Pioneer Electronic Corporation, Tokyo, Japan

[21] Appl. No.: 928,414

[22] Filed: Aug. 12, 1992

[30] Foreign Application Priority Data

Oct. 30, 1991 [JP] Japan .................................. 3-285100
Nov. 27, 1991 [JP] Japan .................................. 3-312681

[51] Int. Cl.[5] .................. H04N 5/275; H04N 1/21; H04N 1/23
[52] U.S. Cl. ..................................... 358/22; 358/403; 358/906; 358/909; 358/183
[58] Field of Search ................... 358/22, 22 CK, 183, 358/186, 400, 401, 403, 404, 335, 906, 909, 209, 133

[56] References Cited

U.S. PATENT DOCUMENTS

| | | | |
|---|---|---|---|
| 4,713,695 | 12/1987 | Macheboeuf | 358/22 CK |
| 4,827,347 | 5/1989 | Bell | 358/909 X |
| 5,018,017 | 5/1991 | Sasaki et al. | 358/909 X |
| 5,032,927 | 7/1991 | Wantanabe et al. | 358/335 |
| 5,177,620 | 1/1993 | Fukushima | 358/403 X |
| 5,179,642 | 1/1993 | Komatsu | 358/22 X |

FOREIGN PATENT DOCUMENTS 63-103583 5/1988 Japan .

OTHER PUBLICATIONS

Ohmachi and Ono "Digest of International Standards for Color Still Picture Coding (Part 1)" Journal of Video Electronics Society of Japan, vol. 20, No. 1, 1991, pp. 50-58.

Primary Examiner—Mark R. Powell
Attorney, Agent, or Firm—Fish & Richardson

[57] ABSTRACT

An image display control apparatus ensures reduction of memory capacity and cost. The apparatus generates an image superimposing instruction when a second screen effect control is not performed, and image data of first to third frame memories are selectively output according to a select signal in the absence of the image superimposing instruction. Image data for superimposition and background data are stored in the third frame memory and a background data memory respectively, and the coincidence of the stored background and superimposition image data is determined. When the image superimposing instruction is issued, image data of the third frame memory and image data produced based on the image data of the first or second frame memory are selectively output according to the results of discrimination to yield single combined image data. A still picture reproducing system produces a still picture even when a control drive unit is connected to a player or a recording medium such as a control disk is not loaded in the control drive unit even when it is connected to the system. When playback control data as a playback control program is not fed to the player, spare control data is read out from first storage means and still picture data is read out by the image drive unit in accordance with the spare control data, to produce a video signal.

5 Claims, 7 Drawing Sheets

IMAGE DISPLAY CONTROL APPARATUS AND STILL PICTURE REPRODUCING SYSTEM

BACKGROUND OF THE INVENTION

1. Field of the Invention

The present invention relates to an image display control apparatus, more particularly, an image display control apparatus which uses first through third image memories to accomplish predetermined screen effects, and a still picture file reproducing system, which reads out recorded data from a recording medium on which still picture is recorded in a compressed manner or an uncompressed manner and restores it as still picture data.

2. Description of Background Information

Recently, the standardization of high definition still picture disks has been pursued. FIG. 1 presents a block diagram showing the fundamental structure of a system which handles such a disk. Referring to FIG. 1, an image drive unit 1, an audio drive unit 2 and a control drive unit 3 access respective disks on which still picture data, audio data and control data are respectively recorded, and send read-out signals to a player 4.

The still picture data read out by the image drive unit 1 is supplied to the input terminal of a selector 5, which selectively switches the output destination for the input data received at its input terminal to either a compression decoder 6 or a selector 7. The compression decoder 6 has a decoding function with JPEG (Joint Photographic Expert Group: international standards for compression of information of a still picture) base-line compression. The output of the compression decoder 6 is connected to the selector 7. The read-out still picture data is supplied to the compression decoder 6 when it is compressed, and is directly supplied to the selector 7 when it is uncompressed. The selector 7 serves to selectively switch the output destination for the received data to one of image memories 8a, 8b and 8c.

The image memories 8a to 8c as a whole have a 3-frame structure in order to exhibit predetermined screen effects, and are respectively treated as frame memories each for one frame. The selective switching of those frame memories 8a, 8b and 8c is usually controlled so as to memorize one of three screens: the current (on-the-air) screen, the next screen and the second next screen. The output data of each of the three frame memories is supplied to a screen effect circuit 9 where, when requested by the system, it is subjected to predetermined screen effect control, such as cutting, dissolving, wiping, roll switching, continuous scroll or program wiping that involves data transfer between memories as its premise to the request of the system. The resultant signal is supplied as an image signal to a CRT display 10 as a display device.

Such video reproducing operation is executed in accordance with playback control data read out by the control drive unit 3. That is, the player 4 performs such control as to provide predetermined screen effect in accordance with the playback control data recorded on a disk loaded in the control drive unit 3. The audio data recorded on a disk loaded in the audio drive unit 2 is read out and is then subjected to predetermined signal processing in the player 4, both also in accordance with the playback control data, to thereby drive loudspeakers 11L and 11R. The operation of those individual devices described above is controlled by a control apparatus (not shown).

In this system, the mode is specified by the control data or through a manual operation to accomplish predetermined screen effect control. In the case where one of a first group of screen effect control instructions for accomplishing ordinary or first screen effect control in the predetermined screen effect control is issued, the third frame memory is not required and the first and second frame memories are used. In the case where one of a second group of screen effect control instructions for accomplishing continuous scroll, for example, is issued, the first, second and third frame memories are used. And output image data of those frame memories are selectively output to execute display control corresponding to each screen effect control instruction.

In the case of performing display control on so-called image superimposing, such as chromakey or superimpose, for superimposing one image on another image to form a single image, different from the aforementioned predetermined screen effect control, however, besides the first through third frame memories used to accomplish the predetermined screen effect control, an image memory for holding an image to be superimposed on an image that is produced based on the image data from those three frame memories is needed. Such need of additional memory is undesirable in view of reducing the memory capacity and improving the cost performance.

If the control drive unit 3 is not connected to the player 4 or if no control disk is loaded in the control drive unit 3 even when it is connected to the player 4, this system will not function at all, disabling the reproduction of a still picture.

SUMMARY OF THE INVENTION

It is therefore a primary object of the present invention to provide an image display control apparatus which is designed to ensure reduction in the memory capacity as well as the cost.

It is another object of the present invention to provide a still picture file reproducing system which can reproduce a still picture even if a control drive unit is not connected to this system or no control disk is loaded in the control drive unit even when it is connected to the system.

To achieve the first object, according to the first aspect of the present invention, there is provided an image display control apparatus having first, second and third frame memories for respectively storing first, second and third image data, the first and second frame memories being used when one of a first group of screen effect control instructions is issued and the first, second and third frame memories being used when one of a second group of screen effect control instructions is issued, whereby the image data of those frame memories are selectively output to execute display control corresponding to each screen effect control, the image display control apparatus further comprising image superimposing instruction means for generating an image superimposing instruction when none of the second group of screen effect control instructions is issued; select control means for selectively outputting the first to third image data in accordance with a select signal corresponding to the screen effect control instruction included in the second group of screen effect control instructions when the image superimposing instruction is not generated; storage control means for storing image data to be superimposed on that image data which is produced based on the first or second image data in the third frame memory as the third image data; background data storage means for storing background data; and discriminating means for comparing the background data stored in the background data storage means with the third image data stored in the third frame memory by the storage control means to discriminate coincidence therebetween, whereby, with the image superimposing instruction being issued, the select control means selectively outputs the third image data and the image data produced based on the first or second image data in accordance with a discrimination result from the discriminating means to thereby yield single combined image data.

The image display control apparatus according to the first aspect of the present invention generates an image superimposing instruction when second screen effect control, which belongs to predetermined screen effect control and uses the third frame memory, is not in progress, selectively outputs the image data of the first to third frame memories in accordance with the select signal corresponding to the screen effect control instruction currently issued when the image superimposing instruction is not generated, stores image data for superimposition in the third frame memory, stores background data, compares the stored background data with the superimposition image data stored in the third frame memory, and selectively outputs the superimposition image data and that image data which is produced based on the image data of the first or second frame memory in accordance with the results of the discrimination to thereby yield single combined image data, when the image superimposing instruction is issued.

According to the second aspect of the present invention, there is provided a still picture file reproducing system comprising recording means on which a still picture file consisting of plural pieces of still picture data is recorded; read means for reading out recorded data from a recording medium having playback control data for the still picture file recorded thereon when the recording medium is loaded in the read means; and reproduction control means, detachably connected to the read means by means of a connector terminal, for reading out still picture data from the recording means in accordance with the read-out playback control data supplied to the connector terminal to thereby produce a video signal, the reproduction control means including first storage means having spare control data previously stored therein, detecting means for detecting whether or not the playback control data is supplied to the connector terminal, and setting means for reading out the spare control data from the first storage means and setting the spared control data as the read-out playback control data when it is detected that no playback control data is supplied to the connector terminal.

In the still picture file reproducing system according to the second aspect of the present invention, when the read means is not connected to the reproduction control means or when no recording medium is loaded in the read means, playback control data as a playback control program is not supplied to the connector terminal which connects the reproduction control means to the read means, so that the spare control data is read out from the first storage means and still picture data is read out from the recording means in accordance with the spare control data, thereby producing a video signal.

DETAILED DESCRIPTION OF THE PREFERRED EMBODIMENTS

The present invention will now be described referring to the accompanying drawings.

Figure 1:
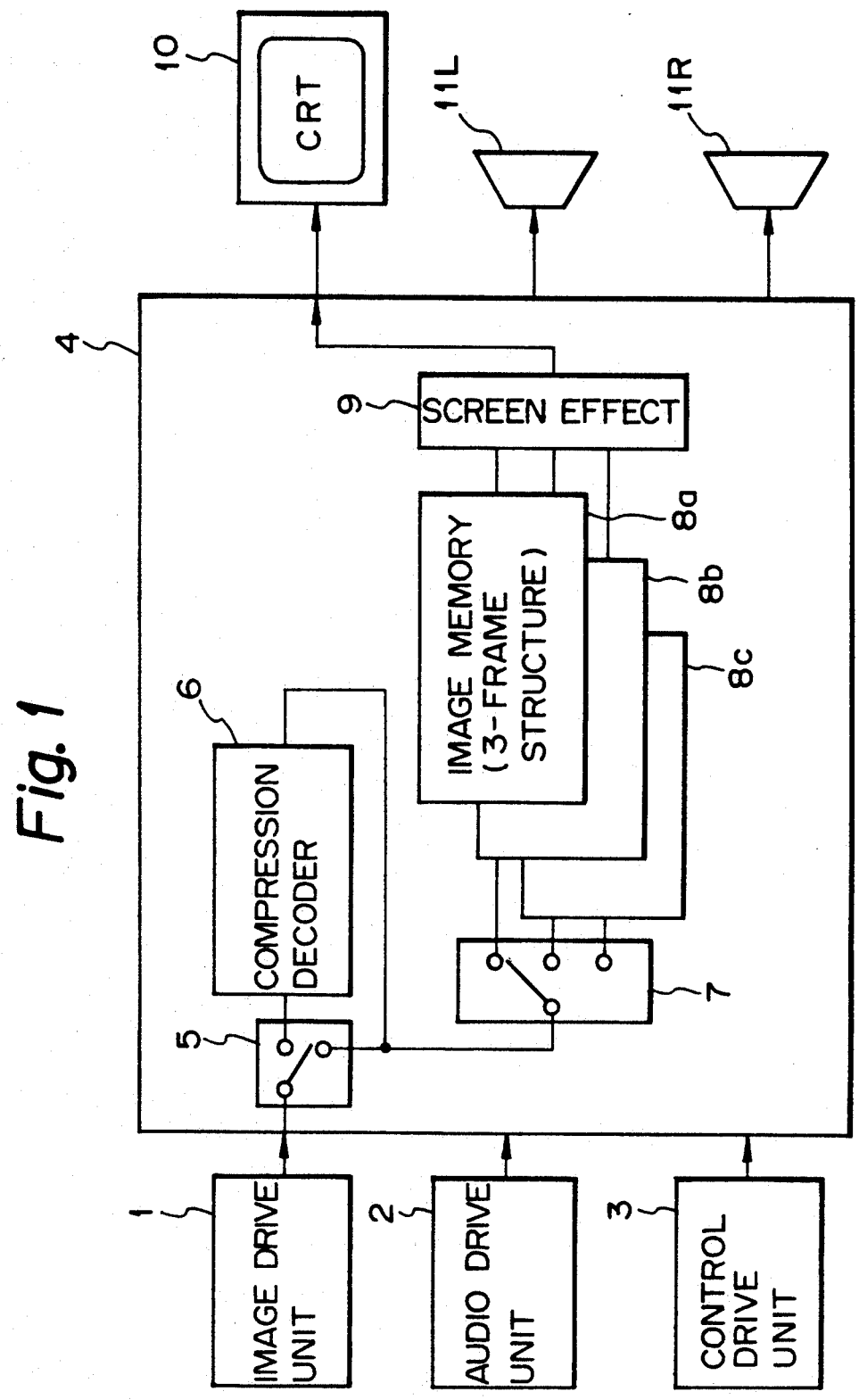
FIG. 1 is a block diagram illustrating the structure of a conventional still picture file reproducing system.
Figure 2:
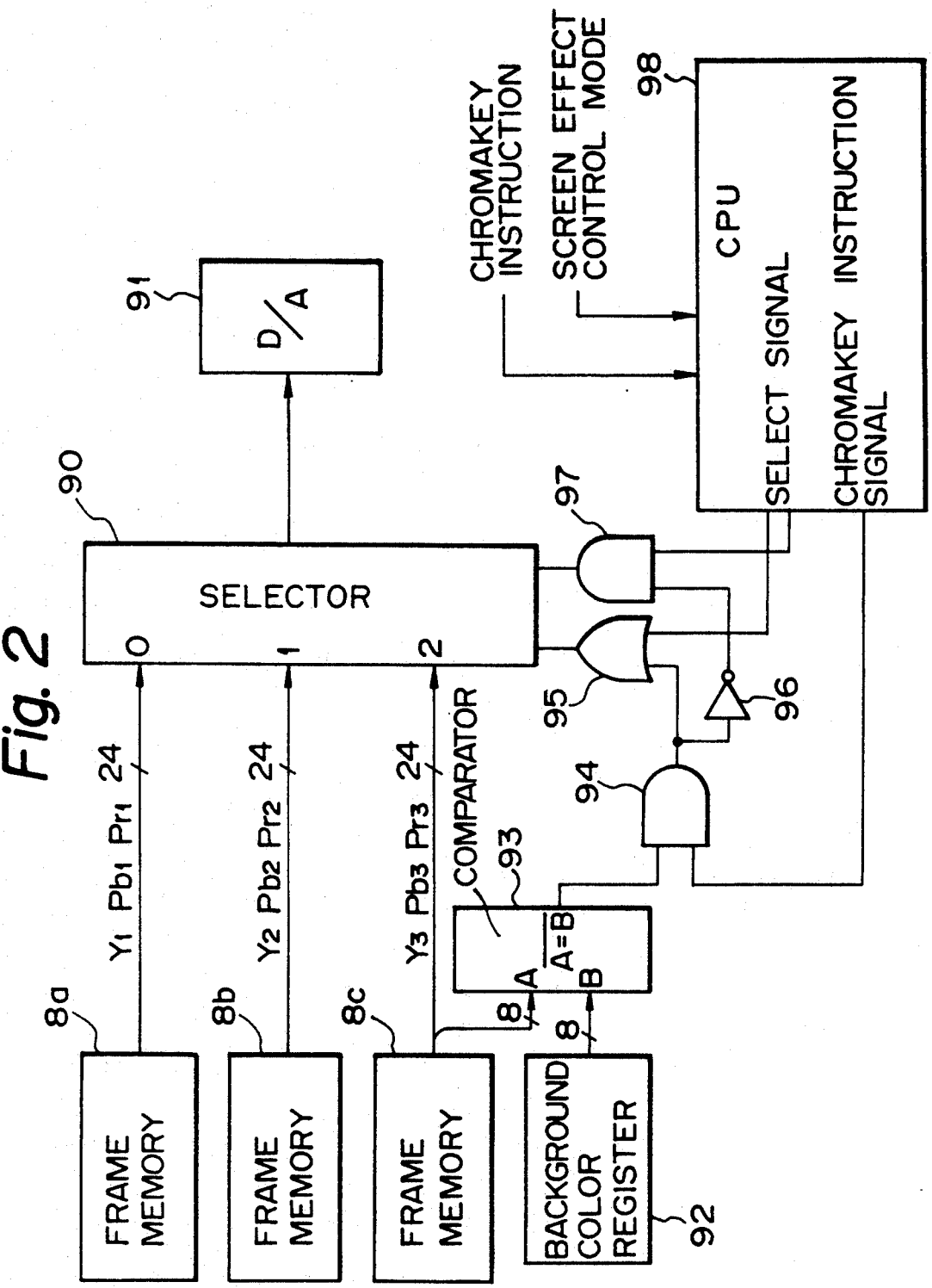
FIG. 2 is a block diagram of an image display control apparatus illustrating one embodiment according to the first aspect of the present invention.

FIG. 2 presents a basic block diagram of an image display control apparatus according to one embodiment of the present invention, using the same reference numerals as used in FIG. 1 for corresponding or identical components.

Referring to FIG. 2, a selector 90 receives first, second and third image data stored in first, second and third frame memories 8a, 8b and 8c and selectively outputs one of those image data to a D/A converter 91 under the control of a controller to be described below.

The controller has a comparator 93 as discriminating means, which compares the output image data from the third frame memory 8c with the output background color data from a background color register 92 to discriminate their matching, and outputs the discrimination result. The comparator 93 outputs a high-level signal when an input A does not match an input B, i.e., when $A \neq B$. In the case where Yn, Pbn and Prn data (n=1, 2, 3) as a luminance signal and color difference signals in the output image data from the individual frame memories each consist of eight bits, a total of twenty-four bits, if the comparator 93 is designed to have an 8-bit structure, and upper two bits of Y3 data, upper three bits of Pb3 data and upper three bits of Pr3 data are extracted and supplied as one input of the comparator 93, this comparator can be made smaller and can afford background color noise in a chromakey image (to be described later). The output background color data from the background color register 92 has a bit structure corresponding to the Y3, Pb3 and Pr3 extracted in the above manner, and can be selectively set in this register by a user as needed.

The output of the comparator 93 is input to one input terminal of a logical product gate 94 which has the other input terminal supplied with a chromakey instruction signal that is generated based on a chromakey instruction issued from a CPU 98 by, for example, a manual operation. The output of the logical product gate 94 is input to one input terminal of a logical sum gate 95 and also to one input terminal of a logical product gate 97 via an inverter 96. The logical sum gate 95 and the logical product gate 97 receive at their other input terminals a 2-bit select signal from the CPU 98 whose content is changed in accordance with the aforementioned predetermined screen effect control mode. The outputs of the logical sum gate 95 and the logical product gate 97 are input to select control input terminals of the selector 90. The selector 90 selectively outputs one of the first to third image data in accordance with the statuses of the signals input to the control input terminals.

Figure 3:
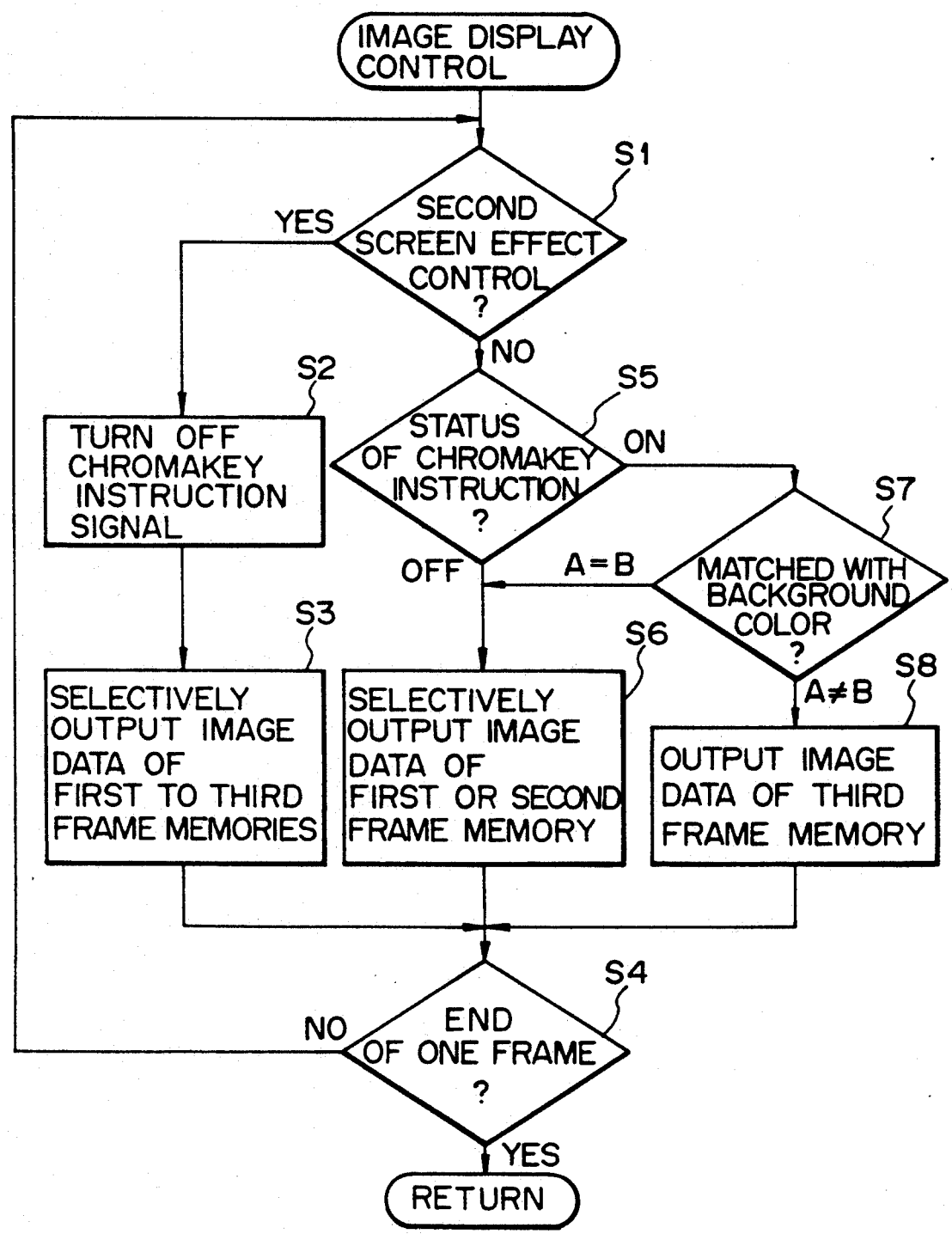
FIG. 3 is a flowchart for explaining the operation of the apparatus shown in FIG. 2.

The operation of this controller will now be described in detail with reference to the flowchart given in FIG. 3. This flowchart illustrates only the operational sequence for display control for one frame.

When the controller is in a mode for the aforementioned second screen effect control to execute continuous scroll or the like, the flow advances from step S1 to step S2 to disable a chromakey instruction signal (i.e., set this signal to a low level) regardless of the chromakey instruction. Consequently, the output of the logical product gate 94 becomes a low level, so that the output statuses of the gates 95 and 97 are determined by the select signal. That is, when one of the second group of screen effect control instructions is issued, the selector 90 receives the select signal "0", "1" or "2" and selectively outputs one of the output image data of the three frame memories 8a, 8b and 8c (step S3). The flow then returns to step S1 through step S4 to repeat the sequence of processes of steps S1, S2 and S3 thereafter until display control for one frame is complete.

When the controller is in a mode for the aforementioned first screen effect control, the flow moves from step S1 to step S5 where the status of the chromakey instruction is discriminated.

When it is determined at this time that no chromakey instruction is present, the CPU 98 sets the chromakey instruction signal to a low level. As a result, the output of the logical product gate 94 becomes a low level, so that the output statuses of the gates 95 and 97 are determined by the select signal. The selector 90 is therefore controlled by the select signal "0" or "1" to selectively output either the output image data of the first frame memory 8a or second frame memory 8b (step S6).

When it is discriminated in step S5 that the chromakey instruction is issued, a high-level chromakey instruction signal as an image superimposing instruction is generated from the CPU 98, and the output of the logical product gate 94 is determined by the status of the discrimination output of the comparator 93 which is one input of this gate 94. The comparator 93 then discriminates whether or not the chromakey image data stored in the third frame memory 8c coincides with the background color data stored in the background color register 92 (step S7).

When there is no matching, the output of the comparator 93 becomes a high level, setting the output of the logical product gate 94 to a high level, so that the output statuses of the gates 95 and 97 become "2", allowing the output image data of the third frame memory 8c to be selectively output (step S8).

When the chromakey image data coincides with the background color data, on the other hand, the output of the comparator 93 becomes a low level, setting the output of the logical product gate 94 to a low level. The selecting action of the selector 90 is therefore controlled by the select signal "0" or "1" from the CPU 98, allowing the output image data of the first frame memory 8a or the second frame memory 8b to be output as in the case that the chromakey instruction signal is disabled (step S6).

As the display control corresponding to the first screen effect control and the status of the chromakey instruction is executed, the flow returns to step S1 through step S4 to repeat the process sequence of steps S1, S5 and S6, or steps S1, S5, S7 and S8, or steps S1, S5, S7 and S6 until display control for one frame is complete.

It is to be noted that chromakey image data is stored in advance in the third frame memory 8c at the time at least the image superimposing instruction like the chromakey instruction signal is generated in separate processing from that of the above-described flowchart.

Figure 4:
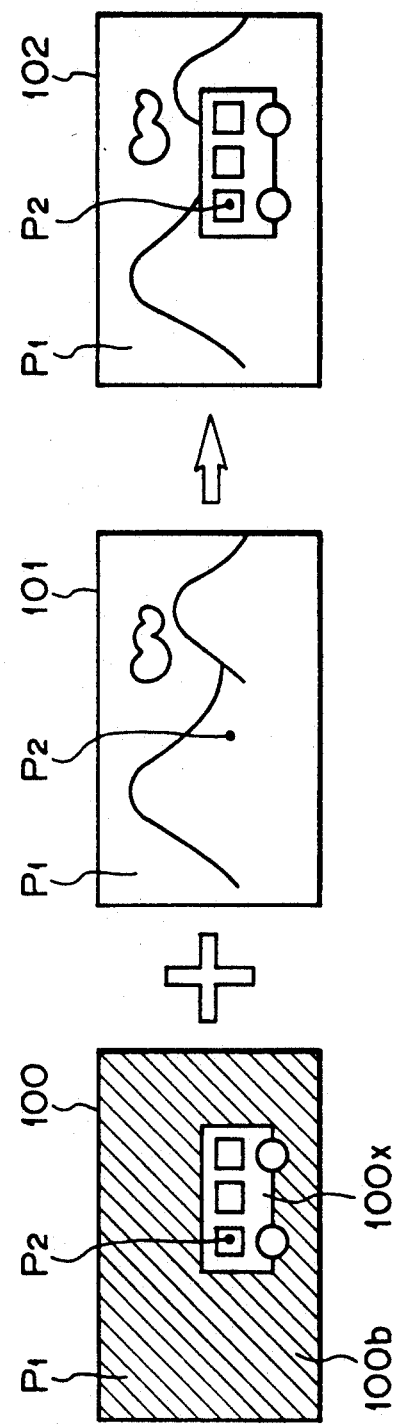
FIG. 4 is a diagram for explaining the operation of the apparatus shown in FIG. 2.

Suppose that chromakey image data 100 as shown in FIG. 4, which has background 100b (shaded portion) in "blue" and to-be-superimposed image data 100x drawn in color other than blue, is stored in the third frame memory 8c and background color data of "blue" is stored in the background color register 92. Also assume that image data 101 as a target image for superimposition is formed based on the output image data of the first frame memory 8a or second frame memory 8b in accordance with the select signal from the CPU 98.

When the position of the output image data of either the first or second frame memory on the screen in so-called one frame scanning is at P1, this point P1 is located in the background image 100b in the third frame memory 8c. Therefore, image data in "blue" is output from the third frame memory 8c and is compared with the background color data from the background color register 92 by the comparator 93. As a result, the comparator 93 outputs a low-level signal indicating that both input data coincide with each other. Accordingly, the selector 90 selectively outputs the image data 101, which is produced based on the output image data of the first or second frame memory in accordance with the select signal.

When the position of the output image data of either the first or second frame memory on the screen in this scanning is at P2, this point P2 lies in the to-be-superimposed image 100x in the third frame memory 8c. Therefore, image data in other color than "blue" is output from the third frame memory 8c and is compared with the background color data from the background color register 92 by the comparator 93. As a result, the comparator 93 outputs a high-level signal indicating that both input data do not coincide with each other. Accordingly, the selector 90 disregards the select signal and outputs the chromakey image data 100 stored in the third frame memory 8c.

In this manner, the selector 90 outputs combined image data 102 which is resulted from the superimposition of the to-be-superimposed image 100x on the target image 101.

The key point of this embodiment lies in that chromakey image data is stored in the third frame memory which is originally needed for screen effect control and, when the second screen effect control such as continuous scroll, which belongs to the predetermined screen effect control and requires the third frame memory, is not executed, the chromakey instruction is issued and image data for superimposition is read out from the third frame memory to perform a chromakey operation. This processing is conducted in view of the fact that there is no need or no purpose in executing image superimposition such as chromakey or superimpose during the second screen effect control (e.g., continuous scroll) which uses the third frame memory. This feature eliminates the need for a separate memory for image superimposition other than the first to third frame memories, and can thus reduce the overall memory capacity of the system and the manufacturing cost without impairing the original functions of the system.

Although this embodiment is accomplished by a hardware structure including the selector, comparator and logical gates, it is not limited to this particular type but may be realized by a software structure using a microcomputer. The advantages of the present invention can be obtained not only in a chromakey operation but also in superimposition of character information on a single image or superimposition of various types of image information. Further, the present invention can be applied not only a high definition still picture system, but also an image display control apparatus which perform predetermined display control using first to third image memories.

In short, the image display control apparatus according to the first aspect of the present invention generates an image superimposing instruction when second screen effect control, which belongs to predetermined screen effect control and uses the third frame memory, is not in progress, selectively outputs the image data of the first to third frame memories in accordance with the select signal corresponding to the screen effect control instruction currently issued when the image superimposing instruction is not generated, stores image data for superimposition in the third frame memory, stores background data, compares the stored background data with the superimposition image data stored in the third frame memory, and selectively outputs the superimposition image data and that image data which is produced based on the image data of the first or second frame memory in accordance with the results of the discrimination to thereby yield single combined image data, when the image superimposing instruction is issued. It is therefore possible to reduce the overall memory capacity of the system and the system cost without impairing the original functions of the system.

An embodiment according to the second aspect of the present invention will now be described in detail referring to the associated drawings.

Figure 5:
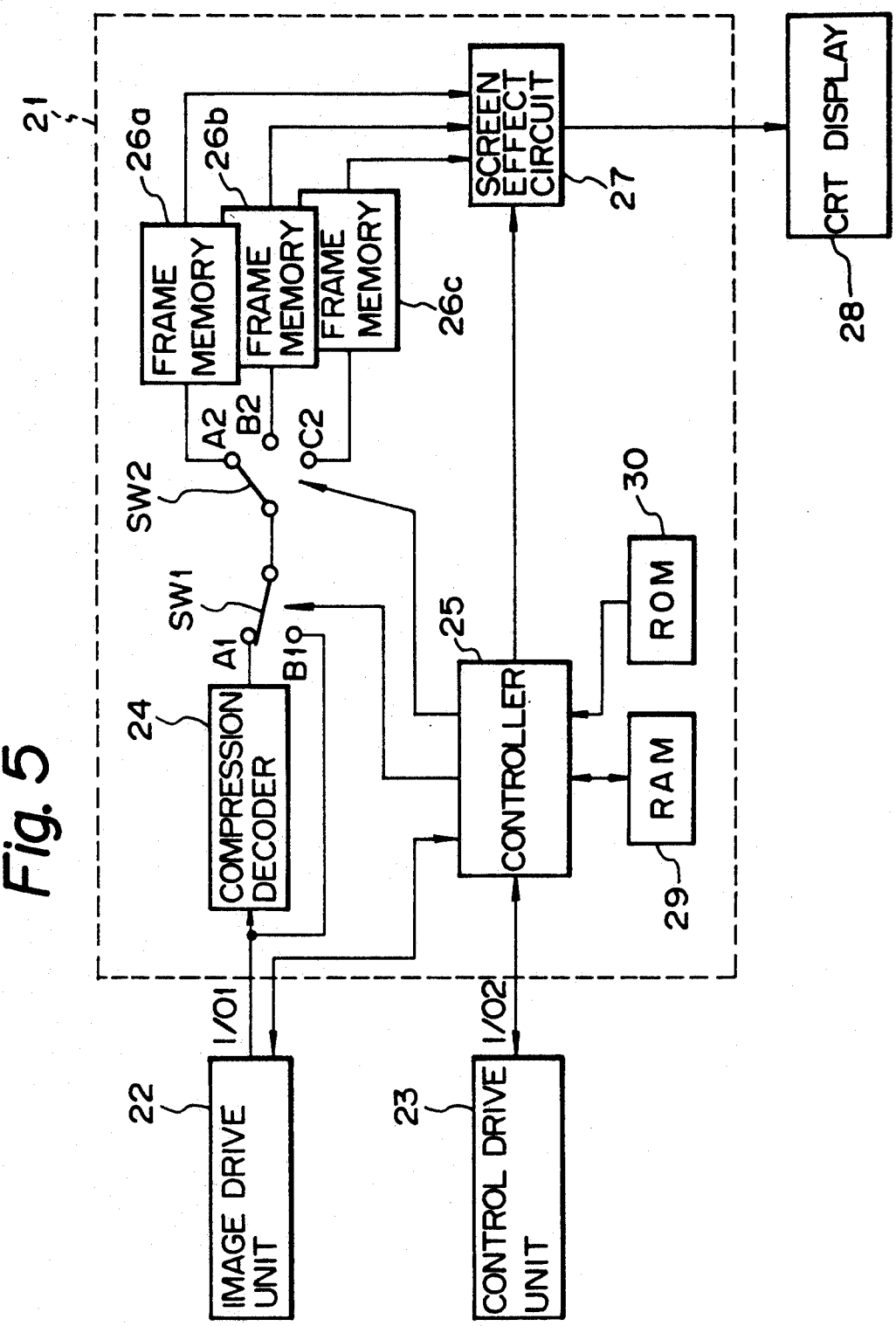
FIG. 5 is a block diagram illustrating one embodiment according to the second aspect of the present invention.
Figure 6:
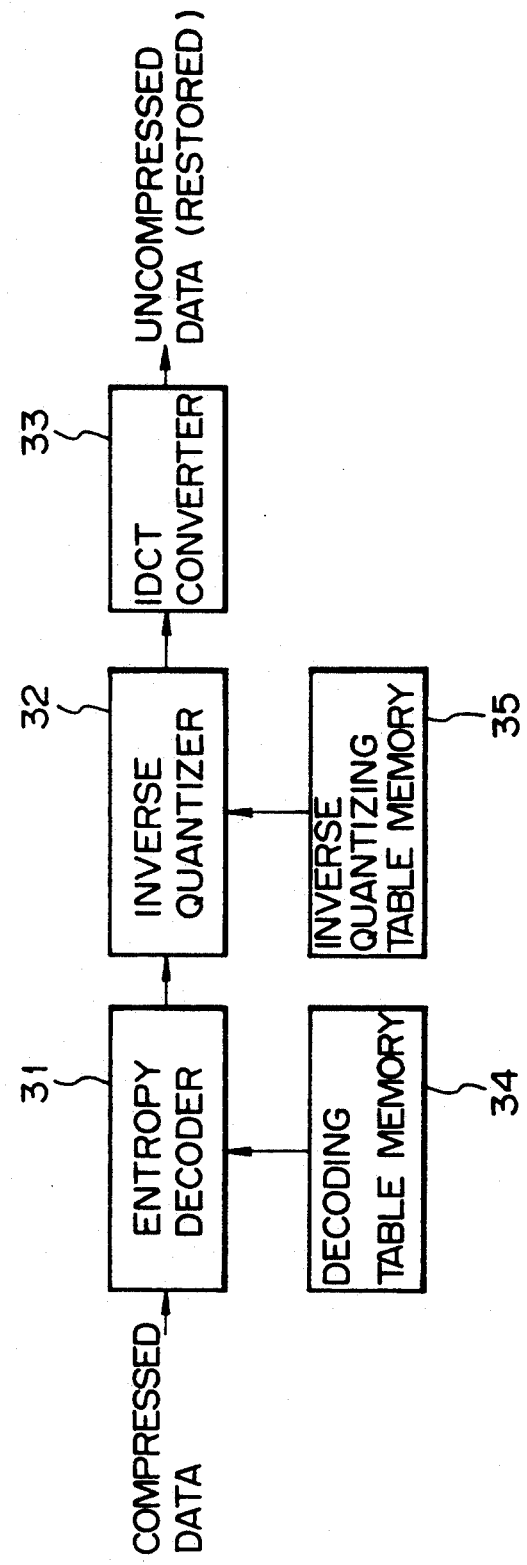
FIG. 6 is a block diagram showing the structure of a compression decoder in the system shown in FIG. 5.

FIG. 5 illustrates a still picture file reproducing system embodying the present invention. In this still picture file reproducing system, an image drive unit 22 and a control drive unit 23 are detachably connected via connector terminals I/O1 and I/O2 to a player 21 which constitutes the main body of the system. In the player 21, a compression decoder 24 and a controller 25 are connected to the connector terminal I/O1 for connection to the image drive unit 22. The compression decoder 24 receives compressed still picture data read out from the image drive unit 22 and, like the aforementioned compression decoder 6, restores data subjected to the JPEG base-line compression to the original data. The compression decoder 24 has its output connected to a switch SW1. The switch SW1 has two fixed contacts A1 and B1, A1 connected to the output of the compression decoder 24. The fixed contact B1 is connected directly to the connector terminal I/O1 for connection to the image drive unit 22. The output of the switch S1 is connected to a switch SW2. The switch SW2 has three fixed contacts A2, B2 and C2 to which three frame memories 26a, 26b and 26c are respectively connected. The frame memories 26a, 26b and 26c, like the frame memories 8a, 8b and 8c, can each store still picture data for one frame, and the proper frame memory for such still picture data is selected by the switch SW2.

Read and write accesses to the frame memories 26a, 26b and 26c are controlled by write and read circuits (not shown) in response to instructions from the controller 25. The read outputs of the frame memories 26a, 26b and 26c are connected to a screen effect circuit 27 whose output is coupled to a CRT display 28 as an external unit.

The connector terminal I/O2 for the control drive unit 23 is connected to the controller 25. The controller 25, which may be constituted of a microcomputer, produces instructions, such as individual data read instructions for the image drive unit 22 and the control drive unit 23, select signals for the switches SW1 and SW2, data write and read instructions for the frame memories 26a, 26b and 26c, and an operation instruction for the screen effect circuit 27. Also connected to the controller 25 are a RAM 29 and a ROM 30. The RAM 29 is constituted of a non-volatile memory so that it can hold written data even when the system is powered off. A spare playback control program is written in advance in the ROM 30.

The compression decoder 24 comprises an entropy decoder 31, an inverse quantizer 32, an IDCT (Inverse Discrete Cosine Transform) converter 33 and memories 34 (decoding table memory) and 35 (inverse quantizing table memroy). The entropy decoder 31 performs Hoffman decoding on compressed still picture data in accordance with a decoding table previously stored in the memory 34. The decoded data is a quantized DCT coefficient which is inversely quantized by the inverse quantizer 32. The inverse quantization is carried out using an inverse quantizing table previously written in the memory 35. The inversely-quantized data is supplied to the IDCT converter 33 to be converted into uncompressed still picture data.

The data compression according to the JPEG standards is specifically disclosed in, for example, "Digest of International Standards for Color Still Picture Coding (Part 1)" (Ohmachi and Ono, Journal of Video Electronics Society of Japan, Vol. 20, No. 1, 1991, pp. 50–58) and Japanese Patent Application Laid Open No. 63-103583.

The file format for still picture data will be discussed below. The file consists of a volume portion, compression parameter portion, a disk correspondency table portion, a directory portion and a data portion. There is one volume portion provided at the fixed sector address on a disk, and control information about the entire disk is recorded in this portion. The volume portion includes a 4-byte control flag whose one byte (8 bits) indicates whether or not any compressed still picture data is included. The volume portion further includes data information portion where the head sector address of each directory, the directory area size, the number of recorded directories, head sector address of data, the head sector address of a free area in the data portion, and the size of free data portion are to be recorded.

The compression parameter portion has a size of one sector, and is provided at a predetermined sector address on each disk to record a default compression parameter necessary in reproducing compressed data. The compression parameter consists of the aforementioned inverse quantizing table and Hoffman decoding table. The disk table portion is provided on a disk where playback control information exists and specifies an image-recorded disk and a voice-recorded disk, which are used in reproduction control. The directory portion is a table that shows the head sector addresses of individual files in the data portion.

The data portion consists of a data header and a data body for each file. Depending on the type of data, a body header is provided in the data body. Recorded in the data header is information such as the head sector address of the next file, the type of data, an area associated with the type of data where the size of an image or the like is recorded, the size of a body header if such exists, and the size of the data body. The types of data include compressed data, uncompressed data, and reduced data.

The playback control data that is read out by the control drive unit 23 consists of a header portion and a playback control data body. Playback control commands are described in a time-series sequence in the playback control data body, constituting the playback control program.

It is to be noted that this file format conforms to the technical standards of the NHK high definition still picture disk system.

Figure 7:
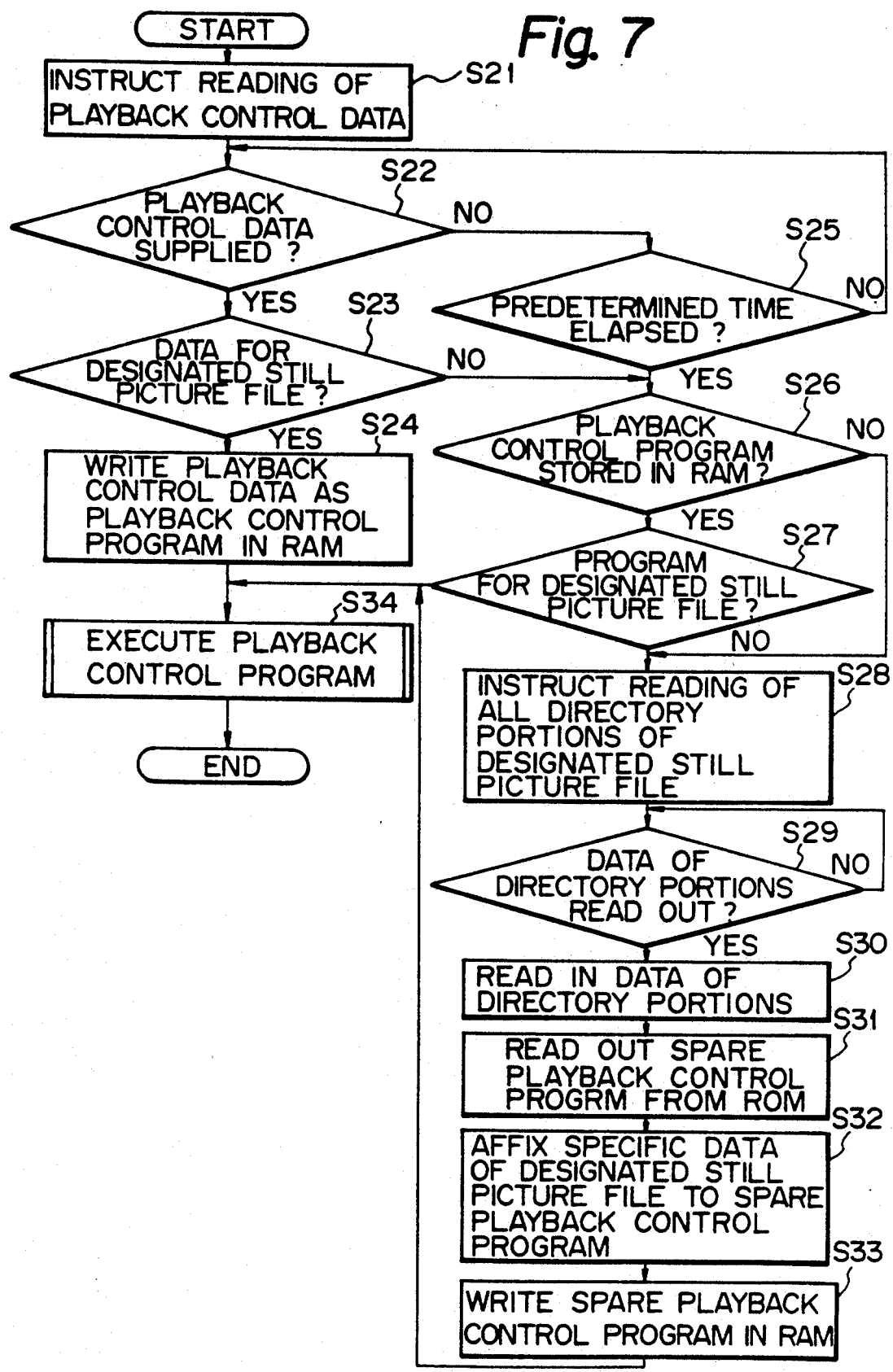
FIG. 7 is a flowchart illustrating a sequence of operations done by a controller in the system shown in FIG. 5.

The operation of the still picture file reproducing system embodying the present invention will be described below referring to FIG. 7. It is assumed that the image drive unit 22 in which a disk having a plural pieces of still picture data are recorded thereon as a still picture file is loaded is connected to the player 21, and the still picture file recorded on that disk is designated by operation means such as a keyboard (not shown).

The controller 25 instructs the control drive unit 23 to read out playback control data in response to an instruction from the operation means to reproduce the designated still picture file (step S21). Then, the controller 25 discriminates whether the playback control data has been read out and supplied via the connector terminal I/O2 (step S22). If the playback control data has been read out from the disk loaded in the control drive unit 23, it is put in an input buffer (not shown) of the controller 25, so that it is discriminated from the contents of the input buffer whether the playback control data has been read out and supplied to the controller 25. When the playback control data is received, it is then discriminated whether or not the playback control data is for the designated still picture file (step S23). This discrimination may be made from the contents of the header portion of the playback control data. When the playback control data is for the designated still picture file, it is written as a playback control program in the RAM 29 (step S24) before the flow advances to step S34 (to be described later).

If no playback control data has been read out yet, an instruction to read the playback control data is issued and it is then determined whether a predetermined time has elapsed (step S25). If the playback control data is founded not for the designated still picture file in step S23, this step S25 is executed too. When the predetermined time has not passed, the flow returns to step S22. When the predetermined time has passed, it is discriminated whether the playback control program has already been written in the RAM 29 (step S26). If the RAM 29 already contains the playback control program, it is determined as in step S23 whether the playback control program is for the designated still picture file (step S27). If the playback control program is for the designated still picture file, the flow moves to step S34. If such is not the case, however, the controller 25 instructs the image drive unit 22 to read all the directory portions of the designated still picture file (step S28), discriminates if data of the directory portions has been supplied (step S29), and reads the data in when receiving the data (step S30). Meanwhile, the controller 25 reads out the spare playback control program as spare control data from the ROM 30 (step S31), affixes specific data in the data from the directory portions, such as the number of still pictures different for individual still picture files, to the spare playback control program (step S32), and write the spare playback control program as the proper playback control program into the RAM 29 (step S33) before advancing to step S34.

In step S34, the controller 25 executes a reproducing operation in accordance with the playback control program stored in the RAM 29. More specifically, the controller 25 issues instructions, such as individual data read instructions for the image drive unit 22, select signals for the switches SW1 and SW2, data write and read instructions for the frame memories 26a, 26b and 26c, and an operation instruction for the screen effect circuit 27, in the order of the steps of the playback control program, reproduces still picture data in order from the data read out from the image drive unit 22, and sends the reproduced data to the CRT display 28.

Although the detecting means for detecting if playback control data has been supplied from the control drive unit 23 is realized by the execution of step S22 in this embodiment, the same may be accomplished by providing a detecting circuit which detects the connection of the control drive unit 23 to the player 21 and the loading of a disk in the control drive unit 23.

If an audio drive unit, which is not provided in this embodiment, is used, the playback control for reading out audio data from a disk loaded in the audio drive unit and producing an audio signal according to the audio data may be executed in accordance with the spare playback control program.

In the still picture file reproducing system according to the second aspect of the present invention, when playback control data as a playback control program is not supplied via the associated connector terminal to the player, the spare control data is read out from the ROM (first storage means) and still picture data is read out by the image drive unit in accordance with the spare control data, thereby producing a video signal. It is therefore possible to reproduce a still picture even when the control drive unit is connected to the player or a recording medium such as a control disk is not loaded in the control drive unit even when it is connected to the system.

What is claimed is:

1. An image display control apparatus having first, second and third frame memories for respectively storing first, second and third image data, said first and second frame memories being used when one of a first group of screen effect control instructions is issued and said first, second and third frame memories being used when one of a second group of screen effect control instructions is issued, whereby said image data of those frame memories are selectively output to execute display control corresponding to each screen effect control, said image display control apparatus further comprising:

image superimposing instruction means for generating an image superimposing instruction when none of said second group of screen effect control instructions is issued;

select control means for selectively outputting said first to third image data in accordance with a select signal corresponding to said screen effect control instruction included in said second group of screen effect control instructions when said image superimposing instruction is not generated;

storage control means for storing image data to be superimposed on that image data which is produced based on said first or second image data in said third frame memory as said third image data;

background data storage means for storing background data; and discriminating means for comparing said background data stored in said background data storage means with said third image data stored in said third frame memory by the storage control means to discriminate coincidence therebetween, whereby, with said image superimposing instruction being issued, said select control means selectively outputs said third image data and said image data produced based on said first or second image data in accordance with a discrimination result from said discriminating means to thereby yield single combined image data.

2. The image display control apparatus according to claim 1, wherein said discriminating means has bit extracting means for extracting a predetermined bits of data from said third image data stored in said third frame memory and discriminates coincidence between said extracted bits of data with said background data stored in said background data storage means.

3. A still picture file reproducing system comprising:

recording means on which a still picture file consisting of a plurality of pieces of still picture data is recorded;

read means for reading out recorded data from a recording medium having playback control data for said still picture file recorded thereon when said recording medium is loaded in said read means; and reproduction control means, detachably connected to said read means by means of a connector terminal, for reading out still picture data from said recording means in accordance with said read-out playback control data supplied to said connector terminal to thereby produce a video signal, said reproduction control means including, first storage means having spare control data previously stored therein, detecting means for detecting whether or not said playback control data is supplied to said connector terminal, and setting means for reading out said spare control data from said first storage means and setting said spared control data as said read-out playback control data when it is detected that no playback control data is supplied to said connector terminal.

4. The still picture file reproducing system according to claim 3, wherein when said playback control data read out by said read means is not associated with said still picture file, said setting means reads out said spare control data from said first storage means and setting said read-out spare control data as said read-out playback control data.

5. The still picture file reproducing system according to claim 3, wherein said reproduction control means includes:

second storage means of a non-volatile type for storing said read-out playback control data set by said setting means; and discriminating means for discriminating whether or not playback control data is stored in said second storage means when it is detected that no playback control data has been supplied to said connector terminal, whereby when said discriminating means determines that said playback control data is stored in said second storage means, said setting means reads out said playback control data from said second storage means and newly sets said playback control data as said read-out playback control data.

* * * * *